(12) United States Patent
Weidhaus

(10) Patent No.: US 7,490,785 B2
(45) Date of Patent: Feb. 17, 2009

(54) PROCESS AND APPARATUS FOR COMMINUTING SILICON

(75) Inventor: Dieter Weidhaus, Burghausen (DE)

(73) Assignee: Wacker Chemie AG, Munich (DE)

( * ) Notice: Subject to any disclaimer, the term of this patent is extended or adjusted under 35 U.S.C. 154(b) by 241 days.

(21) Appl. No.: 11/504,156

(22) Filed: Aug. 15, 2006

(65) Prior Publication Data

US 2007/0040056 A1 Feb. 22, 2007

(30) Foreign Application Priority Data

Aug. 18, 2005 (DE) ........................ 10 2005 039 118

(51) Int. Cl.
*B02C 19/06* (2006.01)
(52) U.S. Cl. .................. 241/5; 241/19; 241/39
(58) Field of Classification Search ............ 241/1, 241/5, 39, 40, 301, 19
See application file for complete search history.

(56) References Cited

U.S. PATENT DOCUMENTS

| | | | |
|---|---|---|---|
| 3,734,413 A | 5/1973 | Kaiser et al. |
| 3,963,838 A | 6/1976 | Setty et al. |
| 4,207,360 A | 6/1980 | Padovani |
| 4,264,546 A | 4/1981 | Becker et al. |
| 4,314,525 A | 2/1982 | Hsu et al. |
| 4,424,199 A | 1/1984 | Iya |
| 4,602,743 A | 7/1986 | Nied |
| 4,691,866 A | 9/1987 | Belk |
| 5,346,141 A | 9/1994 | Kim et al. |
| 5,423,490 A | 6/1995 | Zampini et al. |
| 5,496,416 A | 3/1996 | Hall et al. |
| 5,798,137 A | 8/1998 | Lord et al. |
| 6,398,139 B1 | 6/2002 | Nied et al. |

| | | | |
|---|---|---|---|
| 2006/0088970 A1 | 4/2006 | Hesse et al. |

FOREIGN PATENT DOCUMENTS

| | | |
|---|---|---|
| DE | 1 135 841 | 9/1962 |
| DE | 28 12 019 C2 | 6/1982 |
| DE | 42 39 611 A1 | 5/1994 |
| DE | 195 48 869 A1 | 7/1997 |
| DE | 198 42 078 A1 | 3/2000 |
| DE | 199 43 670 A1 | 3/2001 |
| DE | 100 45 160 A1 | 3/2002 |
| DE | 102 00 688 A1 | 7/2003 |
| DE | 10 2004 048 948 A1 | 4/2006 |

(Continued)

OTHER PUBLICATIONS

Translation of Claim 1—(Corresponding to DE 1 135 841).

(Continued)

*Primary Examiner*—Mark Rosenbaum
(74) *Attorney, Agent, or Firm*—Brooks Kushman P.C.

(57) ABSTRACT

An apparatus for producing silicon seed particles having a size of from 50 μm to 1000 μm from silicon granules having a size of from 300 μm to 5000 μm, comprising a vertically disposed jet chamber with a low cross sectional area and a jet nozzle at the base of the jet chamber through which a milling gas stream is introduced into the chamber; a larger cross section countercurrent gravity separator adjoining the jet chamber, and an inlet for silicon granules, wherein the jet chamber has a length sufficient to allow the milling gas stream to widen to the cross section of the jet chamber.

26 Claims, 7 Drawing Sheets

FOREIGN PATENT DOCUMENTS

| | | |
|---|---|---|
| EP | 0 603 602 A1 | 6/1994 |
| EP | 1 080 786 A1 | 3/2001 |
| EP | 1 645 333 A1 | 4/2006 |
| JP | 57-67019 | 4/1982 |
| JP | 8-109013 | 4/1996 |

OTHER PUBLICATIONS

Patent Abstract Corresponding to DE 198 42 078 A1.
Patent Abstract Corresponding to DE 10 2004 048 948 A1.
Patent Abstract Corresponding to JP 57-67019.
Patent Abstract Corresponding to JP 8-109013.
A. P. Folkin and V. D. Mel'Nikov, "Grinding Mills in the Production of Ultrapure Substances", Zhurnal Vses. Khim. Ob-va im. D. I. Mendeleeva, vol. 33, No. 4, pp. 62-70, 1988.
Naresh K. Rohatgi, "Silicon Production in a Fluidized Bed Reactor: Final Report", JPL Publication 86-17, Apr. 1986, pp. 19-21 and 31-33.
Robert H. Perry and Don W. Green, "Perry's Chemical Engineer's Handbook", 7th Edition, Section 20-47, 1999.
Patbase abstract corresponding to DE 42 39 411 A1.
Patbase abstract corresponding to DE 195 48 869 A1.
Patbase abstract corresponding to DE 199 43 670 A1.
Patbase abstract corresponding to DE 100 45 160 A1.
Patbase abstract corresponding to DE 102 00 688 A1.

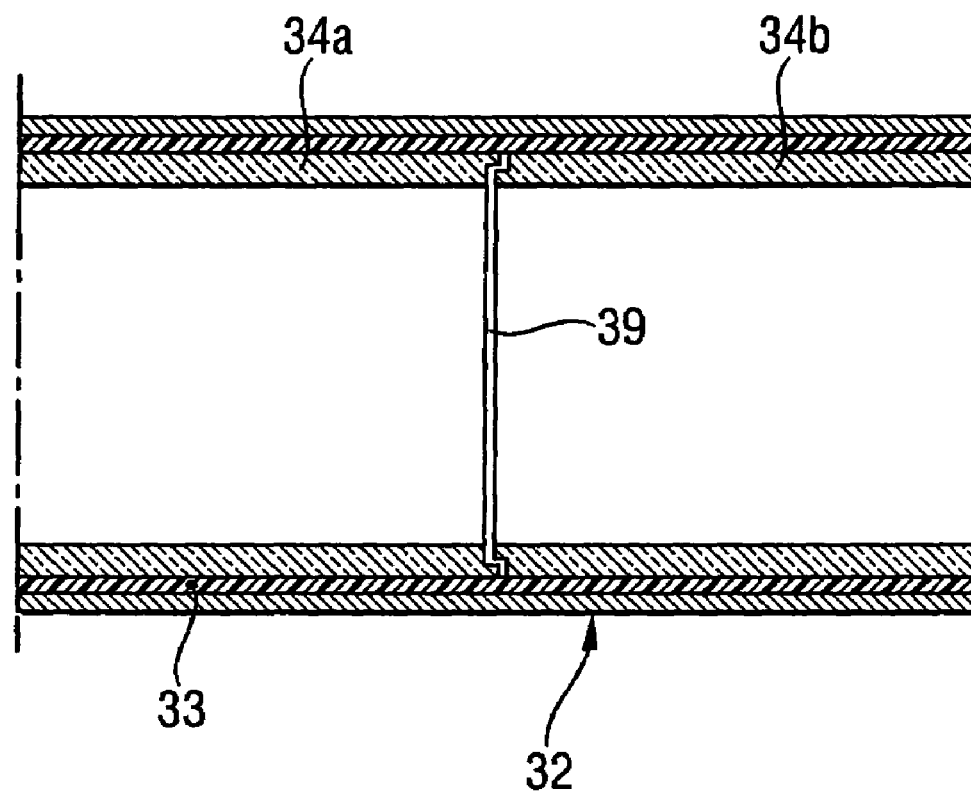

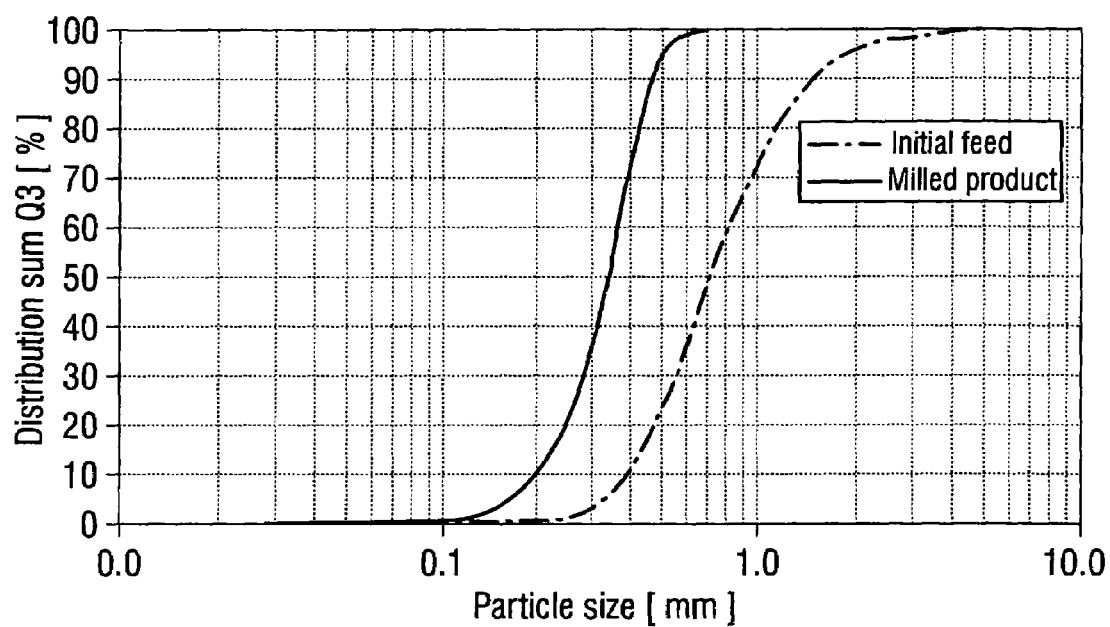
Fig. 7 Mass - referenced overall passage distributions of feed material ( silicon granules ) and milled product ( silicon seed particles )

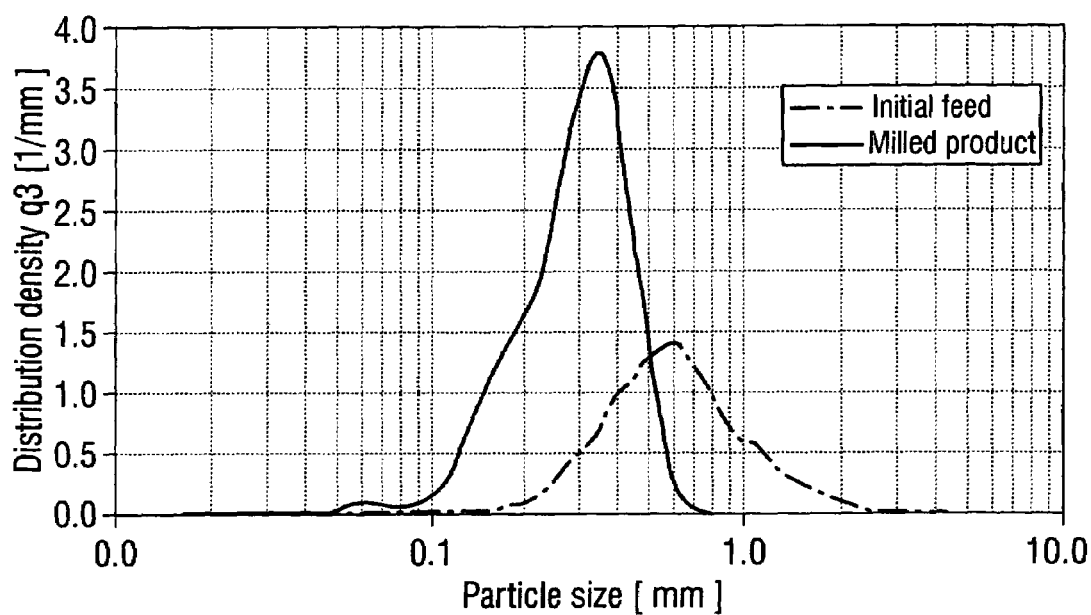
Fig. 8  Mass - referenced distribution densities of feed material (silicon granules) and milled product (silicon seed particles)

PROCESS AND APPARATUS FOR COMMINUTING SILICON

BACKGROUND OF THE INVENTION

1. Field of the Invention

The invention relates to a process and an apparatus for comminuting silicon granules.

2. Background Art

Fluidized bed deposition processes for the production of high-purity silicon granules for the electronics industry or the photovoltaics industry have been described and disclosed in numerous publications. In these processes, silicon particles in a fluidized bed reactor are fluidized by gas and heated to high temperatures. Introducing a silicon-containing gas into the fluidized bed (e.g. silane, tetrachlorosilane or trichlorosilane) leads to a pyrolysis reaction at the particle surface, with elemental silicon being deposited on the particle surface, leading to particle growth. For continuous operation of these processes, relatively large "grown" particles have to be extracted from the fluidized bed as product, and fine particles, known as silicon seed particles, have to be supplied on an ongoing basis. A process of this type is described, for example, by U.S. Pat. No. 3,963,838.

A number of criteria are important for the use of the silicon seed particles in the fluidized bed processes described. First, the silicon seed particles must have a high purity to ensure that the silicon granules produced also meet the requirements of the electronics and photovoltaics industries. In general, metal contamination should amount to less than 100 ppbw, preferably less than 10 ppbw; contamination with dopants boron and phosphorus should be less than 1000 pptw, preferably less than 250 pptw; and contamination by carbon should be less than 1000 ppbw, preferably less than 250 ppbw.

Second, although the size of the silicon seed particles should be smaller than that of the silicon granules, it cannot be too small. This is because particles which are too fine will be discharged from the fluidized bed with the exhaust gas stream and are therefore unsuitable for use as silicon seed particles. The limit for the discharge, depending on operating conditions and processes, is in the range from approx. 50 µm to 250 µm. A fines fraction in the silicon seed particles below this limit leads to silicon losses and to dust being entrained in the exhaust gas systems from the fluidized bed deposition. Finally, the grain size distribution of the silicon seed particles has an effect on the particle population balance of the fluidized bed deposition and therefore also on the grain size distribution of the silicon granules. To achieve a steady-state grain size distribution of the silicon granules which is not excessively wide, it is important for the silicon seed particles to be able to be produced reproducibly with a defined and narrow grain size distribution.

In addition to producing silicon granules, silicon seed particles are also required as a starting material in the photovoltaics and electronics industries, for example, the use of fine-grain high-purity silicon powder for the production of silicon carbide powder as a base material for high-resistance substrate material for electronic devices, described in German laid-open specification DE 19842078A1, and for the production of wafers for photovoltaic applications by melting fine-grain silicon powder on a substrate material, followed by cooling and solidification, as described in U.S. Pat. No. 5,496,416. Hitherto, it has often been impossible, or at least very difficult and/or expensive to obtain corresponding grain size distributions directly from the fluidized bed deposition or by classification from the product of the fluidized bed deposition.

There are several known technologies for producing silicon seed particles. According to U.S. Pat. No. 4,207,360, silicon particles which have been fluidized with inert gas tend to be comminuted in a high-temperature fluidized bed (approx. 1000° C.). In the process, the desired silicon seed particles are formed. The document also mentions the variant of combining this fluidized bed with a fluidized bed for depositing silicon to form an integrated process. Both processes have the drawbacks of extremely high energy consumption which is necessary to heat the fluidized bed, and silicon seed particle grain size distribution and production rate which are very difficult to control.

U.S. Pat. No. 4,314,525 describes a further integrated process in which silicon-containing gases, in particular silanes, are heated to or beyond their decomposition temperature. In the process, the silicon-containing gas breaks down to form extremely fine silicon particles. The particles formed during this homogenous vapor deposition are referred to as nuclei, and can theoretically be used as silicon seed particles. One drawback is that the size of the nuclei is in the nanometer range, and even agglomeration effects can only produce silicon seed particles of a few micrometers. The use of such particles as silicon seed particles in a fluidized bed for the production of silicon granules, typically with a grain size in the range from 50 µm to several millimeters, leads to a large proportion of these tiny silicon seed particles being discharged from the reactor with the gas stream. Additional equipment is required to avoid this.

In addition to these thermal-mechanical or chemical processes, purely mechanical comminution processes are also known for the production of silicon seed particles. According to the Abstract of JP 57-067019 (Shin Etsu Hondatai), silicon seed particles are obtained from silicon granules by the granules being comminuted in a double roll crusher and then fractionated by sieving. Contamination of the silicon seed particles with other elements is prevented by the surface of the rolls being provided with a layer of silicon. The silicon-silicon material pairing between roll and material being milled, however, leads to considerable wear to the layer of silicon on the rolls, and consequently only short machine campaigns are possible before the rolls have to be replaced. A significant improvement with regard to roll wear while at the same time still achieving a low level of contamination of the material being milled is brought about by the use of rolls with a hard metal surface and a modified roll nip geometry, as described in DE 102004048948.

The Abstract of JP 08-109013 describes a further comminution process. According to this document, pre-crushed lumpy silicon can be comminuted in a pinned disk mill to form silicon seed particles. A disadvantage of designs of this type is that it is almost impossible to produce a contamination-free or low-contamination material. Considerable contamination of the milled product is likely. Therefore, downstream wet-chemical cleaning of the surface of the milled product is imperative if this product is to be used to produce high-purity silicon.

U.S. Pat. No. 4,691,866 describes a process in which silicon granules are accelerated to high speeds by means of a gas jet in accordance with the injector principle and propelled onto a stationary obstacle. The impact crushes the particles to form the desired silicon seed particles. To keep contamination at a low level in this process, the obstacle is preferably made from silicon. However, as has already been mentioned in connection with the roll crushing process, the silicon-silicon material pairing leads to considerable wear to the obstacle.

Jet mills for the comminution of very pure materials are described in Fokin, A. P.; Melnikov, V. D.: Grinding Mills In The Production Of Ultrapure Substances—Zhurnal Vses. Khim. Ob-va im. D. I. Mendeleeva; Vol. 33, No. 4, pp. 62-70, 1988. In jet mills, the granular feed material is accelerated by high-speed fluid jets. When these accelerated particles impact on particles with a lower velocity, impact stresses occur, with the particles being broken up according to the impact energy.

A counter-jet mill for producing silicon seed particles is known from Rohatgi, Naresh K.; Silicon Production in a Fluidized Bed Reactor: Final Report—JPL Publication; No. 86-17, 1986. In this process, particles are accelerated by two gas jets and are propelled onto one another so that particles break up. However, the authors mention only a low yield, and consequently the silicon granules have to be milled a number of times.

U.S. Pat. No. 4,424,199 describes a process in which, in addition to the other gas streams, a single high-speed gas jet is used in a fluidized bed for the deposition of silicon, in order for some of the silicon granules in the fluidized bed to comminute to form silicon seed particles. An advantage of this process is that there is no need for any silicon granules to be removed from the deposition reactor, milled and returned, but a disadvantage is that in this case too, the production rate and the resulting grain size distribution of the silicon seed particles are difficult to control. However, controlled operation of fluidized bed deposition is a fundamental requirement. Moreover, the gas jet may have an adverse effect on the deposition process in the fluidized bed. The idea of jet milling within the fluidized bed for silicon deposition is one that is also addressed by S. Lord in U.S. Pat. No. 5,798,137.

The simplest form of a jet mill is the fluidized bed jet mill with a gas jet directed vertically upward. In these jet mills, the gas jet on the one hand accelerates the particles but on the other hand also ensures that the particles are kept suspended in the milling chamber, i.e. are in the fluidized state. It is customary for mills of this type also to be equipped with a classification apparatus which classifies particles discharged with the gas stream, and which recirculates excessively coarse particles to the fluidized bed. A corresponding apparatus is described, for example, in U.S. Pat. No. 4,602,743.

FIG. 1 shows the structure of a conventional fluidized bed jet mill. In an arrangement of this type, the milling gas (1) or the milling gas stream is supplied via a jet nozzle (4) (designed as a simple nozzle or as a Laval nozzle), which is arranged at the base of the milling chamber (5). The feed material (2) is fed to the milling chamber from the side via an inlet (6). A fluidized bed (7), in which the particles accelerated by the gas jet collide with other particles and are thereby comminuted, is formed in the milling chamber from milling gas (1) and particles. The comminuted particles escape from the milling chamber in the upward direction together with the milling gas stream (1) as a joint stream (3). The gas jet is used firstly for acceleration and subsequent comminution of the particles. Secondly, however, the milling gas stream (1) also leads to a classifying effect in the milling chamber. Although the gas jet locally flows into the chamber at a very high velocity, on account of the jet widening and the interaction with the particles, the gas stream is distributed uniformly over the cross section of the milling chamber. If the rate at which a particle drops in the milling chamber is lower than the mean gas velocity in the milling chamber (volumetric flow of the milling gas (1) with respect to the cross section of flow of the milling chamber), the particle is carried out of the milling chamber (5) with the milling gas stream (1).

In gas/particle systems, and in particular in gas classification processes, the particle size whose drop rate in the milling chamber precisely matches the mean prevailing gas velocity for example in a classification apparatus is referred to as the separation grain size. The drop rate of a particle in the milling chamber is directly dependent on its grain size, increases considerably with increasing grain size and can be calculated for example by means of the following formula:

$$18Re_{ws}+3Re_{ws}^{1.5}+0.3Re_{ws}^{2}-Ar=0$$

where $$Re_{ws} = \frac{u_{ws}d_p}{v} \quad Ar = \frac{(p_s - p_f)gd_p^3}{p_f v^2}$$

where $u_{ws}$ Drop rate of individual particles in the milling chamber $d_p$ Particle diameter $v$ Kinematic viscosity of the fluid $p_s, p_f$ Density of the solid or fluid, respectively g Gravitational acceleration Therefore, defining the milling gas stream and milling chamber cross section also defines the separation grain size and therefore the upper limit for the grain size distribution of the milled product. Accordingly, increasing the introduction of energy into the milling chamber by means of a higher gas throughput increases the separation grain size, and therefore also the upper limit, and consequently also the mean grain size of the comminuted particles which are discharged from the milling chamber. At the same time, the solids concentration in the fluidized bed drops. The introduction of energy and the grain size which can be achieved are directly linked to one another.

Jet mills are eminently suitable for the comminution of high-purity silicon granules, because the comminution is effected substantially as a result of the silicon particles colliding with one another. The stressing of components which are in contact with the particles is of only subordinate importance. Moreover, the corresponding components can be lined with a noncontaminating or low-contamination material or may be made entirely from such material. The supply of energy for comminution is effected solely by way of the gas jet. If high purity gases are used for this purpose, the gas jet will also not represent a contamination source. The main drawback of conventional jet mills for the production of silicon seed particles is the fact that the optimum working range of these prior art apparatuses is at milled product grain sizes of approx. 2 µm to 10 µm, i.e. in the range of what is known as ultrafine comminution. In this range, the specific gas consumption is less than 10 kg of gas per kg of solid; Robert H. Perry; Don W. Green: PERRY'S CHEMICAL ENGINEERS' HANDBOOK, 7th Edition,—McGraw-Hill; 1997, Section 20-47. The larger the grain size of feed material and milled product becomes, the less efficiently the mill operates; the specific gas consumption becomes greater and the process correspondingly less economical. It is customary then to switch to other comminution processes, such as for example the roll crushing process referred to above.

U.S. Pat. No. 5,346,141 explains that a significant factor in the efficiency of fluidized bed jet milling for the production of silicon seed particles is the solids concentration in the fluidized bed; the term "solids concentration" is to be understood as meaning the volumetric concentration of the solids particles: a high solids concentration in the region of the jet nozzle leads to a considerable drop in the milling performance, and consequently this patent teaches carrying out the milling in a very dilute fluidized bed with solids concentrations of preferably less than 10% by volume. Nevertheless, the milling performance which can be achieved with this arrangement remains very low and is associated with a high specific energy and/or gas consumption. Example 2 of U.S. Pat. No. 5,346,141 cites a specific nitrogen consumption of 48 kg of nitrogen per kg of solid for the comminution of silicon granules to a mean grain size of 445 µm: 200 liters/minute of nitrogen; 5.2 grams/minute of silicon, i.e. a gas consumption which is approx. five times as high as is otherwise customary in ultrafine jet milling. Moreover, the space-time yield is very low. According to this document, an increase in the solids concentration leads to a further drop in the milling performance.

SUMMARY OF THE INVENTION

It is an object of the present invention to provide an apparatus which makes it possible to produce silicon seed particles of a particle size of from 50 µm to 1000 µm from silicon granules with a particle size of from 300 µm to 5000 µm in an economic way, i.e. at low cost and in pure form. The average size of the product seed particles is lower than the average size of the starting granules. These and other objects are achieved by an apparatus comprising a vertically disposed jet chamber (8) with a preferably cylindrical cross section and having a jet nozzle (4) at the base of the jet chamber (8) through which a milling gas stream (1) can be introduced into the jet chamber (8); a countercurrent gravity separator (9) directly adjoining the jet chamber (8) and an inlet (6) for silicon granules (2), wherein the jet chamber (8) has a length which is sufficient to widen the milling gas stream to the cross section of the jet chamber, and the jet chamber (8) has a smaller cross section of flow than the countercurrent gravity separator (9). One embodiment of such an apparatus is illustrated in FIG. 2.

BRIEF DESCRIPTION OF THE DRAWINGS

FIG. 6 is a longitudinal cross section of a jet chamber;

FIG. 7 illustrates a mass referenced particle size distribution of feed particles and seed particle product; and FIG. 8 illustrates mass referenced distribution densities of feed particles and seed particle product.

DETAILED DESCRIPTION OF THE PREFERRED EMBODIMENT(S)

Figure 1:
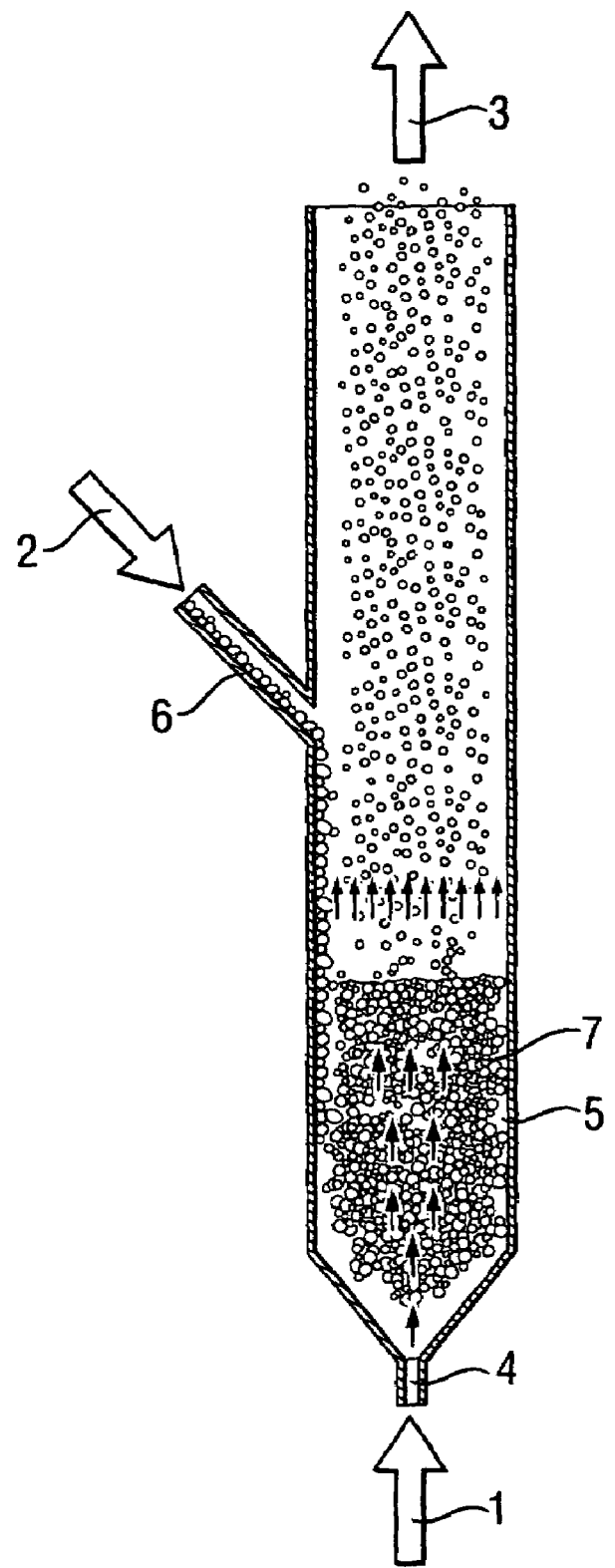
FIG. 1 shows the structure of a conventional fluidized bed jet mill.

To allow successful acceleration of the individual particles in a jet mill, it is important that the gas jet can be successfully formed. As has already been explained in U.S. Pat. No. 5,346,141, this is only possible at low solids concentrations, since a high solids concentration in the region of the jet nozzle interferes with the formation of the jet. However, a low solids concentration is, in turn, disadvantageous for milling, since the accelerated particles have only a low probability of colliding with other particles. The apparatus according to the invention is constructed such that particles are accelerated using a gas stream in a region of a low solids concentration, and these particles then fly into a region with a high solids concentration, where there is a high probability of them colliding with other particles, thereby being comminuted.

The apparatus according to the invention is subject to less wear than the known apparatuses for producing silicon seed particles. It allows the production of silicon seed particles which have a low product contamination without further purification and are therefore suitable in particular for use as silicon seed particles in fluidized bed processes for producing high-purity silicon granules as feed material for the electronics and photovoltaics industries.

In the apparatus according to the invention, a fluidized bed which is locally limited at the top and the bottom, the milling zone (10), is formed in the transition zone from the jet chamber (8) to the countercurrent gravity separator (9). The milling zone (10) has a high solids concentration, preferably of greater than 20% by volume, whereas only a low solids concentration, preferably of less than 10% by volume, more preferably less than 5% by volume, but greater than 0.1% by volume, is present in the jet chamber (8).

The fluidized bed with a locally high solids concentration is produced by virtue of the jet chamber being delimited at the top by the countercurrent gravity separator, the cross section of flow of which is larger than the cross section of flow of the jet chamber, and by the fact that the milling gas stream has to pass through the separator.

The geometries of jet chamber and countercurrent gravity separator and also the milling gas flow are matched to one another preferably in such a way that in the countercurrent gravity separator the mean gas velocity corresponds to the rate at which the largest particles of the desired grain size distribution of the silicon seed particles drop through the milling chamber. It is preferable for the separation grain size in the separator therefore to correspond to the upper limit of the desired grain size distribution of the silicon seed particles. The mean gas velocity of the milling gas stream (based on the cross section of the jet chamber or of the separator) in the jet chamber is higher than in the separator. The separation grain size in the jet chamber is therefore greater than in the separator, but should not exceed the mean range of the grain size distribution of the silicon particles of the feed material, to ensure that sufficient particles can still enter the jet chamber.

Silicon particles of the feed material which are larger than the separation grain size in the countercurrent gravity separator but smaller than the separation grain size in the jet chamber accumulate in the milling zone, where they form a local fluidized bed with a high solids concentration. Only silicon particles of the feed material which are larger than the separation grain size in the jet chamber pass into the jet chamber, where they are accelerated and propelled onto the fluidized bed with a high solids concentration, so that the particles are comminuted. Sufficiently comminuted silicon particles which are smaller than the separation grain size in the countercurrent gravity separator are discharged from the separator as milled product together with the gas stream.

The advantage of this arrangement resides in the fact that particles are very successfully accelerated in the jet chamber, in a manner similar to that of a solids injector, and are then propelled onto a high-density fluidized bed, which leads to very effective comminution there. At the same time, the countercurrent gravity separation leads to a defined upper limit for the grain distribution of the silicon seed particles produced.

The apparatus according to the invention can be used to produce silicon seed particles in the grain size range from approx. 50 µm to 1000 µm with an efficiency which is otherwise only customary for the ultrafine comminution of particles of a size in the range from 2 to 10 µm.

It has been found that particularly effective milling can be achieved if the cross section of flow (cross-sectional area) of the jet chamber is selected to be at least 10% to 30%, preferably 20% to 30%, smaller than the cross section of flow of the countercurrent gravity separator.

It is preferable for the jet chamber to be at least twice as long, preferably 2 to 8 times as long, as the distance which the milling gas stream requires from its emergence from the nozzle until the point at which it has widened to the cross section of the jet chamber. It is easy to design the jet chamber with the jet widening of approx. 18° to 20° (half-angle) which is customary for free gas jets.

The construction of jet chamber and separator according to the invention allows the energy input of the milling gas stream and the grain size to be decoupled from one another. The separation grain size of the countercurrent gravity separator alone defines the upper limit of the grain size distribution of the milled product.

In a preferred embodiment, the silicon granules are not added to the jet chamber, but rather to the separator. As a result, the silicon granules are classified even before they enter the milling zone. Particles in the feed material which are already smaller than the separation grain size of the separator are discharged with the gas stream and do not enter the milling zone, where their comminution would contribute to the undesirable formation of fine dust.

In a particularly preferred embodiment, the silicon granules are fed into the separator above the jet chamber, the weight of silicon particles in the jet chamber and in the separator being determined on an ongoing basis using a weighing unit, and the metering of the silicon granules being controllable by means of a control unit in such a way as to achieve optimally efficient milling.

The efficiency of the milling is highly dependent on the loading in the mill/separator unit. If insufficient silicon granules are metered into the first separator, the solids concentration in the milling zone drops and the energy of the gas jet is not fully exploited. If an excessive amount of silicon granules is metered in, the milling zone and the first separator becomes overloaded with particles and the milling capacity and separation capacity of the first separator drop. It has been established that up to a loading level of approx. 0.30 kg/h of solids per kg/h of gas, the weight of silicon granules in the mill/separator unit can be kept constant and more than 75% of silicon seed particles within the target grain size range, based on the feed material, is achieved. The efficiency of milling also rises in accordance with the increasing load. Above a loading of approx. 0.30 kg/h of solids per kg/h of gas, the weight of silicon granules in the mill/separator unit increases on an ongoing basis, the installation becomes overfilled and uncomminuted particles are included in the product.

For optimum operation of the installation, therefore, the mill/separator unit is preferably provided with capacity for weighing, for example by means of a weighing cell. The cell weighs the mill/separator unit, preferably continuously, and from this information determines the weight of the particles in this unit, known as the hold-up, for example by means of a computer unit. Metering of the silicon granules, preferably in a manner controlled by means of the computer unit, is used to regulate the quantitative flow of the metered granules in such a way that the hold-up is maintained as constant as possible. The particular advantage of this arrangement over mere control of a constant addition quantity, is that the grain size distribution of the silicon granules has only a minor effect on the results of milling.

In a preferred embodiment of the invention, the countercurrent gravity separator is designed in the form of a zigzag separator with a rectangular cross section of flow directly above and adjoining the jet chamber, the cross section of flow of the separator being larger than the cross section of flow of the jet chamber. Zigzag separators are known from the prior art and described, for example, in German patent DE 1 135 841. They offer the advantage of a greater particle separation sharpness compared to separators with a straight flow passage. In this embodiment of the invention, the milling zone is a locally tightly restricted region with a high solids concentration in the region where the cross section of flow widens from the jet chamber to the zigzag separator.

It is preferable for the first separator to be followed by a second countercurrent gravity separator, preferably once again a zigzag separator with a rectangular cross section of flow, the cross section of flow of which is larger still than that of the first separator. It is preferable for the milled particles, together with the milling gas stream and any additionally injected gas, to pass from the first separator into the second separator, where defined, generally undesired, excessively finely milled particles are discharged upwards with the gas stream according to the separation grain size of this separator and the desired grain size fraction of the silicon seed particles drops downward into a collection vessel. Excessively finely milled silicon particles can be separated out of the exhaust gas stream, for example by means of cyclone and filter.

It is preferable for the gas inlet region of at least one separator to be provided with an additional gas inlet, in order to allow further fine adjustment of the separation grain sizes of the separators. An additional gas stream is optionally fed in, with the result that the separation grain size of the separators is in each case shifted toward larger grain sizes. The classifying gas used is preferably high-purity nitrogen.

The upper limit and lower limit of the grain size distribution of the silicon seed particles can be defined by the dimensioning of the cross sections of flow of the two countercurrent gravity separators, the milling gas nozzle cross section, the setting of the nozzle admission pressure of the milling gas nozzle and the gas flows in the additional gas inlets of the separators: in general, the nozzle admission pressure and the nozzle diameter are used to set the gas flow and the maximum jet velocity in accordance with general laws for compressible gases. This also fixes the introduction of energy for comminution. The separators are dimensioned in such a way that in each case the desired separation grain size results together with the given gas stream.

The generally undesired fine dust which is also produced can be collected with little or no contamination if the unit for separating the fine dust from the exhaust gas stream of the installation is designed accordingly. It is particularly appropriate to use a lined cyclone and a filter, preferably a cloth filter with high-purity PTFE fabric, for this purpose.

With the exception of the metering unit for supplying the feed material, the apparatus according to the invention does not have any moving parts. Moreover, the apparatus has a simple geometry. This is particularly favorable for a lining with a noncontaminating material or a material which produces only little contamination. An example of a noncontaminating lining material is monocrystalline silicon, the purity of which is greater than or equal to that of the feed material. Materials which do not produce much contamination are to be understood as meaning materials which have a high purity and which have a very low proportion of substances which have an adverse effect on the application properties (in particular boron, phosphorus, metals), this concentration preferably being less than 100 ppmw, such as for example high-purity plastics which have been produced without additives such as light and heat stabilizers, antioxidants, processing auxiliaries, modifiers, or flame retardants. Such plastics include polyethylene, polypropylene, polytetrafluoroethylene, polyurethane, ethylene-tetrafluoroethylene copolymer, perfluoroalkoxy copolymer, or Halar® ethylene-chlorotrifluoroethylene copolymer, a product of Solvay Solexis.

The invention also relates to a process for comminuting silicon granules to form silicon seed particles using a jet mill of the invention, which offers both the advantages and the efficiency of jet milling at the level of ultrafine jet milling. In this process, silicon granules are comminuted by a fluidized bed with a high solids concentration being formed from the silicon granules in the milling zone and by individual silicon particles of the silicon granules being accelerated by a high-speed milling gas stream in a cylindrical jet chamber in which there is only a low solids concentration and impinging on the fluidized bed with a high solids concentration, resulting in crushing of silicon granules and silicon particles.

The term high solids concentration is preferably to be understood as meaning a volumetric solids concentration of 20 to 50% by volume. A low solids concentration is to be understood as meaning a volumetric solids concentration of less than 10% by volume, preferably less than 5% by volume, but greater than 0.1% by volume.

The size of the silicon granules to be comminuted is preferably from 300 µm to 5000 µm. The size of the silicon seed particles produced is preferably from 50 µm to 1000 µm, more preferably from 150 µm to 500 µm, the mass-referenced median value of the grain size distribution most preferably being between 300 µm and 400 µm, and the proportion by mass of particles less than 150 µm and greater than 500 µm being less than 10%.

The milling gas used is preferably a high-purity gas; the term high-purity is to be understood as meaning a proportion of impurities of no more than 5 ppm. By way of example, it is possible to use purified air, argon or nitrogen, preferably purified nitrogen with a purity of greater than 99.9995% by volume.

The milling gas jet is preferably directed vertically upward. For effective acceleration of the particles, inlet velocities at the nozzle of more than 300 m/s are required, and it is preferable to establish velocities of from 400 to 800 m/s. With a predetermined jet chamber geometry and gas throughput, the velocity can be adjusted by the nozzle diameter. The throughput can easily be adjusted by setting the gas pressure upstream of the nozzle.

The milling gas flow and cross section of flow of the jet chamber are designed in such a way that the separation grain size in the jet chamber is larger than the largest particles of the desired grain size distribution of the silicon seed particles and smaller than the mean grain size of the silicon particles of the feed material.

The process of the invention has a low specific gas consumption, preferably of less than 10 kg of gas per kg of milled product, and at the same time allows a high yield of silicon seed particles. The process allows contamination-free comminution of silicon granules, and also permits the production of silicon seed particles of a defined, narrow grain size distribution without the milled product having to be subjected to subsequent sieving. An additional sieving step would entail additional work and potential contamination. Moreover, the yield of silicon particles, expressed in quantity of silicon particles produced per quantity of feed material, would be reduced.

Silicon seed particles of a size of 50 µm to 1000 µm, more preferably from predominantly 150 µm to 500 µm, are produced, the mass-referenced median value of the grain size distribution most preferably being between 300 µm and 400 µm, and the proportion by mass of particles smaller than 150 µm and larger than 500 µm being less than 10%. This defined, narrow grain size distribution of the high-purity silicon seed particles is desirable, since during metering of the silicon seed particles into a fluidized bed deposition reactor, finer material would be discharged immediately with the exhaust gas stream. Coarser silicon seed particles would grow further in the fluidized bed and thereby disrupt the overall grain distribution in the fluidized bed.

The process of the invention can be used to mill not only silicon seed particles for fluidized bed deposition but also other silicon grain fractions targeted for particular applications. These are, in particular, applications which require a defined, very fine grain distribution and an extremely high purity, such as for example silicon particles needed as a base material in the photovoltaics and electronics industries.

Figure 3:
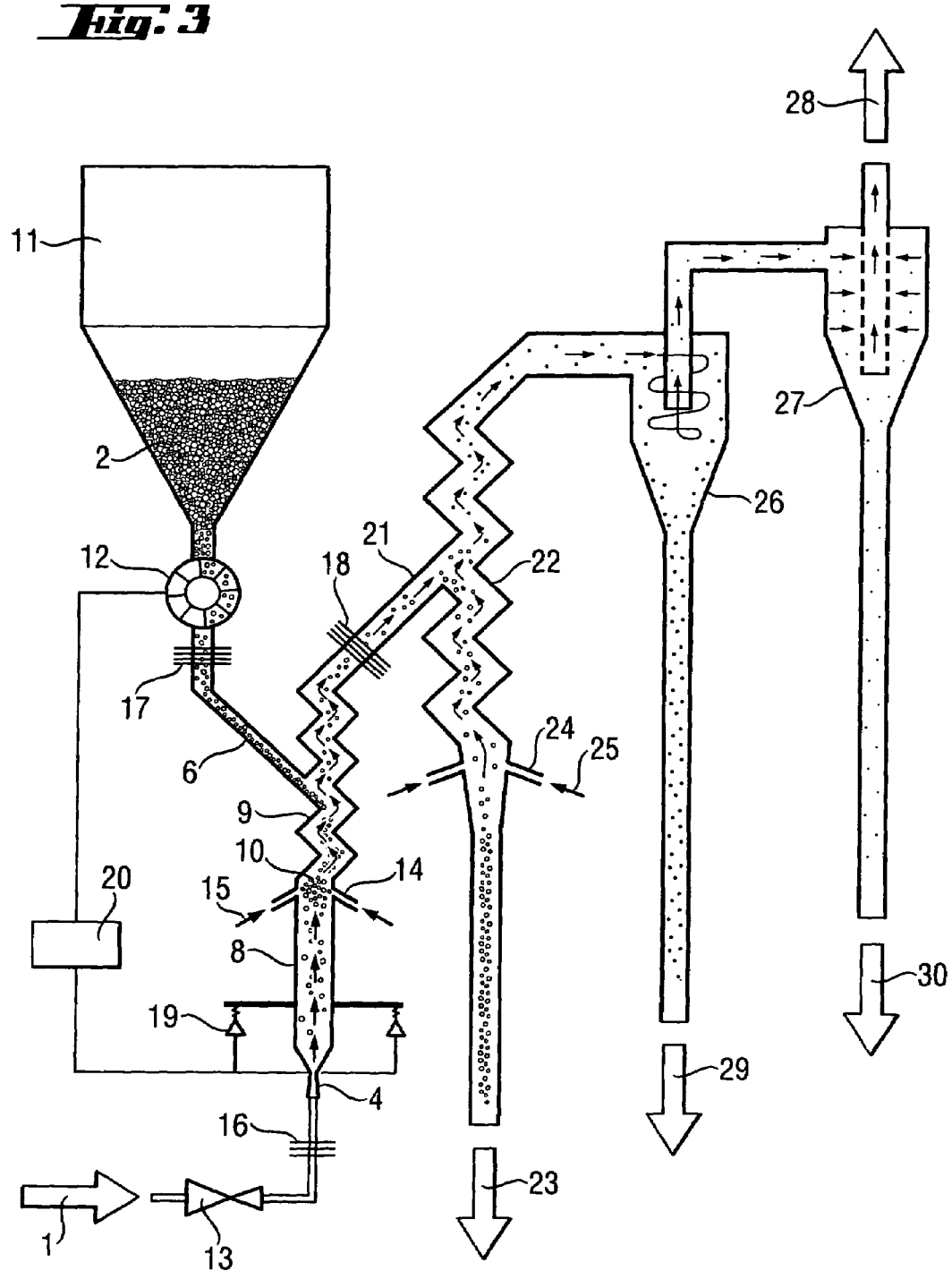
FIG. 3 shows a preferred embodiment of the apparatus according to the invention.

FIG. 3 shows a particularly preferred embodiment of the apparatus according to the invention. A preferred embodiment of the process according to the invention is described below on the basis of the example of this apparatus:

The silicon granules (2) are metered from a storage container (11) via a feed line (6) into the first zigzag separator (9) by means of a metering device (12). The jet chamber (8) is located directly beneath the first separator (9). The milling gas stream (1) is injected into the jet chamber (8) via a Laval nozzle (4). A throttle member (13) is used to set the milling gas flow. A fluidized bed, the milling zone (10), is formed in the transition between jet chamber (8) and first separator (9). An additional gas stream (15) for adjusting the separation can be fed in via gas inlets (14). The jet chamber (8) and the first separator (9) are decoupled from the remainder of the installation in terms of forces by compensators (16), (17) and (18). A weighing apparatus (19) determines the weight of jet chamber (8), first separator (9) and the particles which are present therein. From this information, a computer unit (20) determines the weight of the particles in the milling chamber/separator unit. This value serves as a guide variable for controlling the metering of feed material. Particles with a diameter of smaller than the separation grain of the first separator (9) pass from the first separator (9), together with the milling gas stream and any additional classifying gas, into the second zigzag separator (22) via a connecting line (21). The particles in the desired target grain size range drop downward. The particle stream (23) is collected in a container. Gas inlets (24) can be used to feed an additional gas stream (25) into the second separator (22) in order to adjust the second separation. Excessively fine particles are discharged upward from the second separator (22) together with the milling gas stream and any additional classifying gas. These particles are separated from the gas stream in a cyclone (26) and a downstream filter (27). The gas stream (28) which has been purified in this way escapes from the installation. The excessively finely milled particles drop downward out of the cyclone and filter. The corresponding particle streams (29) and (30) can be collected again in containers.

It is particularly preferable for those parts of the apparatus according to the invention which come into contact with the silicon particles to comprise an outer metallic casing with an inner wall provided with a lining. The lining used is silicon in monocrystalline or polycrystalline form or a plastics material, preferably polyethylene, polypropylene, polytetrafluoroethylene, polyurethane, ethylene-tetrafluoroethylene copolymer, perfluoroalkoxy copolymer or Halar® copolymer. The materials are preferably used in high-purity form.

It is particularly preferable for inliners, preferably made from polycrystalline or monocrystalline silicon or quartz, to be installed in a positively locking manner in a jet chamber which has been lined in this manner and/or in a separator which has been lined in this manner. The materials are preferably used in high-purity form. There is no need for a seal between the inliners or between lining and inliner. When the process according to the invention is being carried out, fine silicon dust fills the gaps between the inliners or between lining and inliner, so that these gaps become blocked as the operating time progresses.

Although wear is of subordinate importance compared to other comminution processes, it has been found that the components jet chamber, jet chamber/separator transition and first separator components are subject to a greater degree of wear than the remainder of the product-carrying components. The wear is typically higher by a factor of approximately 10 to 100. In another preferred embodiment, therefore, the jet chamber, jet chamber/separator transition and first separator components are internally lined with polyurethane alone, since polyurethane has proven particularly wear-resistant.

A comparison of the analyses of feed material and silicon seed particles produced demonstrates that an apparatus of this type can carry out milling with virtually no contamination.

Figure 2:
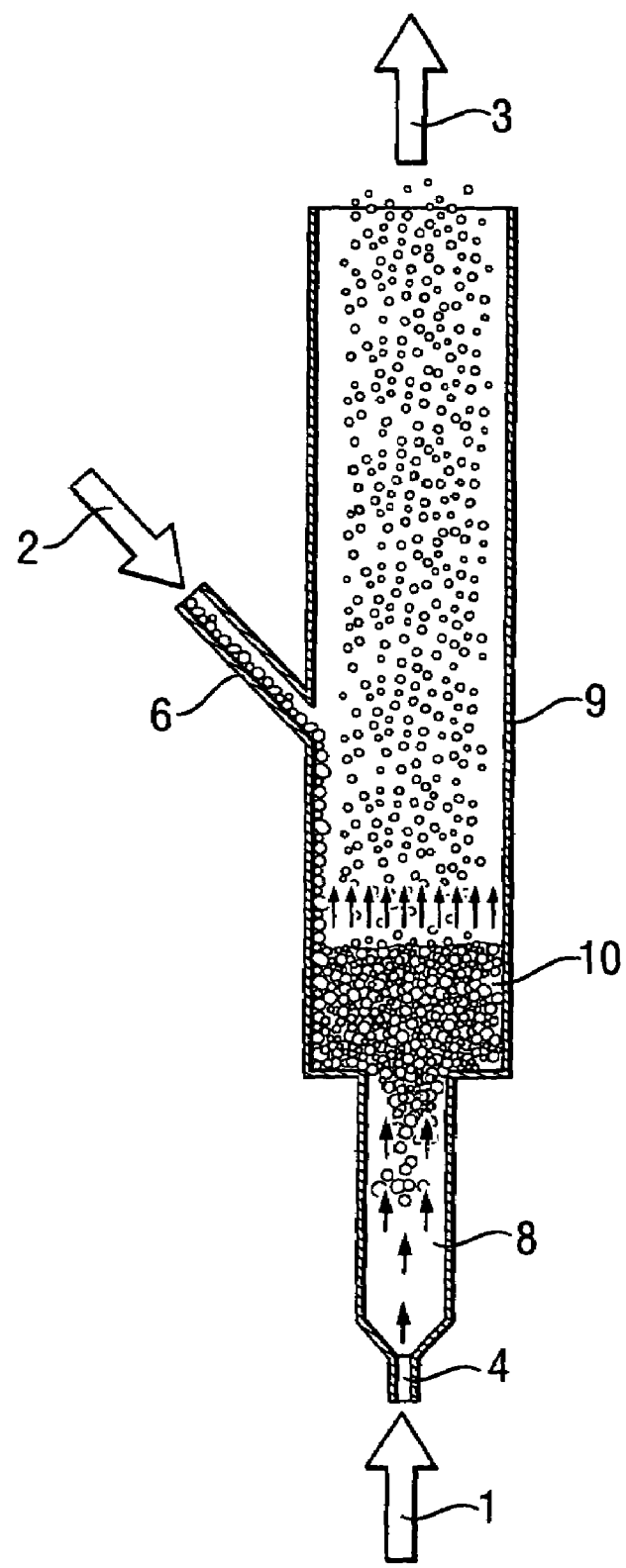
FIG. 2 shows the structure of one embodiment of an apparatus according to the invention.
Figure 4:
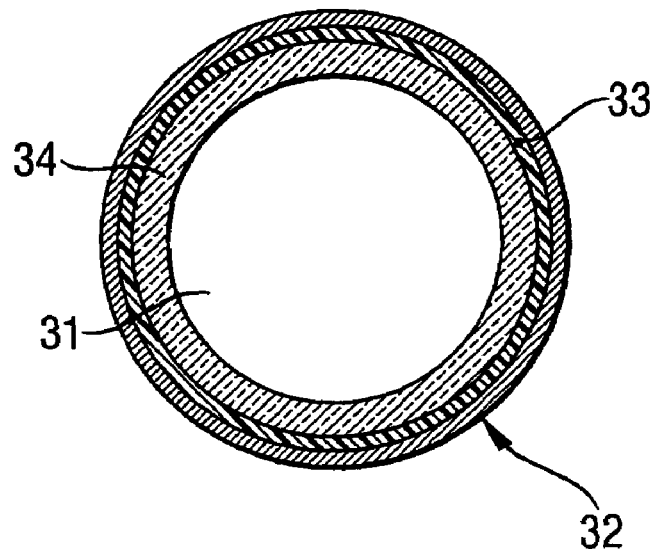
FIG. 4 illustrates a cross section of a jet chamber.
Figure 5:
FIG. 5 illustrates a cross section of a zigzag separator.

With reference to the figures, the solid arrows in FIGS. 1 to 3 in each case mark the path of the gas flow in the apparatus, and FIGS. 4, 5 and 6 explain the flow guidance and the preferred lining concept of the apparatus.

FIG. 4 shows a cross section through a jet chamber (32) perpendicular to the direction of the milling gas flow. The cross section of flow for the milling gas flow (31) is circular. The metallic base body of the jet chamber (32) is provided on the inside with a lining of high-purity plastic (33). The flow passage is delimited by a silicon inliner (34).

FIG. 5 shows a cross section through one of the zigzag separators perpendicular to the direction of the milling gas flow. The cross section of flow for the milling gas flow (35) is rectangular. The metallic base body (36) is provided on the inside with a lining of high-purity plastic (37). The flow passage is delimited by a silicon inliner (38).

The cross section of flow for the gas flow is larger in the first separator than in the jet chamber. The cross section of flow for the gas flow is larger in the second separator than in the first separator.

FIG. 6 shows a longitudinal section through part of the jet chamber in the direction of the milling gas flow and illustrates the installation of the silicon inliners (34a) and (34b). The inliners (34a) and (34b) are installed in a positively locking manner in the metallic base bodies of the jet chamber (32), which have been provided with a lining of high-purity plastic (33). There is no need for any special attachment or adhesive bonding. The individual inliners (34a) and (34b) are connected to one another by projections and recesses. The gap (39) which is formed fills up with ultrafine dust while the installation is operating and thereby provides additional stability to the inliners. The milled product cannot be contaminated by moving behind the inliners, on account of the plastic lining.

The following example serves to further explain the invention:

EXAMPLE 1

High-purity silicon granules were comminuted in a milling installation as illustrated in FIG. 3. The purpose of the milling was to produce silicon seed particles with a grain size distribution of between approximately 150 µm and 500 µm, the mean diameter (mass-referenced) of which was to be between 300 µm and 400 µm, from silicon granules with a grain size distribution between 250 µm and 4000 µm, with a mean diameter (mass-referenced) of 711 µm.

The flow cross section of the jet chamber was 3020 mm$^2$, the flow cross section of the first zigzag separator was 4200 mm$^2$ and the flow cross section of the second zigzag separator was 19,600 mm$^2$. The milling flow nozzle, a Laval nozzle, had a narrowest circular cross section with a diameter of 4 mm. The jet chamber had a length of 550 mm.

The milling installation was operated for 14.5 hours. The mean metering of the feed material was in this case 17.83 kg/h. The Laval nozzle was used to set a milling gas flow of 52 m$^3$/h (s.t.p.) of purified nitrogen of quality 5.5 (purity>99.9995%), i.e. the loading was on average 0.274. No additional classifying gas stream was metered into the first separator. 4 m$^3$/h (s.t.p.) of purified nitrogen was metered into the second separator as an additional classifying gas stream.

The pressure in the jet chamber/separator combination was kept approximately at atmospheric pressure (1013 hPa+/−100 hPa) with the aid of a suction apparatus in the exhaust gas stream of the installation.

During the milling operation, the quantity of silicon granules in the jet chamber and first separator was controlled to a constant 2.5 kg by weighing as described. Given the dimensions and the gas streams, the separation grain size of the jet chamber is 623 µm; for the first separator, the separation grain size is 516 µm, and for the second separator, the separation grain size is 140 µm. In total, 258.5 kg of silicon granules were milled, of which 235 kg were collected as milled product beneath the first separator. 20.7 kg of fine particles were collected beneath the cyclone, and a further 2.8 kg of ultrafine particles were removed from the gas stream in the filter.

FIG. 7 shows the mass-referenced overall pass distributions of feed material (silicon granules) and milled product (silicon seed particles). FIG. 8 shows the mass-referenced distribution densities of feed material (silicon granules) and milled product (silicon seed particles). The silicon seed particles had a mean diameter (mass-referenced) of 337 µm. The proportion of undesired coarse and fines fractions (larger than 500 µm or smaller than 150 µm) was approx. 8%.

The specific nitrogen consumption was 3.93 kg of gas per kg of feed material or 4.32 kg of gas per kg of milled product. The yield of milled product, based on the feed material, was 90.9%, the yield of milled product in the target grain size range between 150 µm and 500 µm, based on the feed material, was 83.6%.

The feed material and the milled product were tested for metallic contamination using mass spectrometry (ICP-MS: inductively coupled plasma mass spectrometry) based on ASTM F1724-01. The results for the metals iron, chromium and nickel, for feed material and milled product, were in each case below the detection limits of the analysis method. The detection limits were 2100 pptw for iron, 170 pptw for chromium and 400 pptw for nickel. Accordingly, metallic contamination of the silicon granules during milling is at most in the region of or below the detection limits of the analysis method.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for producing silicon seed particles of an average size of from 50 µm to 1000 µm from silicon granules of a larger average size of from 300 µm to 5000 µm, comprising a vertically disposed jet chamber with a first cross section, having a jet nozzle at the base of the jet chamber to introduce a milling gas stream into the jet chamber; a first countercurrent gravity separator of a second cross section, adjoining the jet chamber; an inlet for silicon granules, and an outlet for comminuted silicon seed particles, wherein the jet chamber has a length which is sufficient to allow the milling gas stream to widen to the cross section of the jet chamber, and wherein the jet chamber has a smaller cross section than the cross section of the countercurrent gravity separator.

2. The apparatus of claim 1, wherein the cross section of the jet chamber is at least 10% to 30% smaller than the cross section of the countercurrent gravity separator.

3. The apparatus of claim 2, wherein the jet chamber is at least twice as long as the distance which the milling gas stream requires from its emergence from the nozzle until the point at which it has widened to the cross section of the jet chamber.

4. The apparatus of claim 1, wherein the cross section of the jet chamber is at least 20% to 30% smaller than the cross section of the countercurrent gravity separator.

5. The apparatus of claim 1, wherein the jet chamber is at least twice as long as the distance which the milling gas stream requires from its emergence from the nozzle until the point at which it has widened to the cross section of the jet chamber.

6. The apparatus of claim 1, wherein the jet chamber is 2 to 8 times as long as the distance which the milling gas stream requires from its emergence from the nozzle until the point at which it has widened to the cross section of the jet chamber.

7. The apparatus of claim 1, wherein the inlet for the silicon granules opens into the separator.

8. The apparatus of claim 1, further comprising a weighing unit which determines the weight of silicon particles in the jet chamber and separator.

9. The apparatus of claim 8, wherein the weight of silicon particles metered in is controlled to optimize milling efficiency.

10. The apparatus of claim 1, wherein the countercurrent gravity separator is a zigzag separator with a rectangular cross section.

11. The apparatus of claim 10, where a further countercurrent gravity separator with a cross section which is larger than the cross section of the first separator, follows the first countercurrent gravity separator.

12. The apparatus of claim 1, wherein an additional gas inlet for a classifying gas is present in the inlet region of at least one of a first or further separator.

13. The apparatus of claim 1, wherein components which contact silicon particles comprise an outer metallic casing with an inner wall provided with a lining.

14. The apparatus of claim 13, wherein the lining consists of silicon in monocrystalline or polycrystalline form or is a plastics material.

15. The apparatus of claim 14, wherein the plastics material comprises at least one polymer selected from the group consisting of polyethylene, polypropylene, polytetrafluoroethylene, polyurethane, ethylene-tetrafluoroethylene and ethylene-chlorotrifluoroethylene copolymer.

16. The apparatus of claim 13, wherein an inliner is installed in a positively locking manner in the components provided with the lining.

17. The apparatus of claim 16, wherein the material of at least one inliner is selected from the group consisting of polycrystalline silicon, monocrystalline silicon, quartz, and combinations thereof.

18. The apparatus of claim 1, further comprising a collector for silicon seed particles, said collector in communication with said outlet.

19. The apparatus of claim 18, wherein said collector comprises a filter.

20. A process for comminuting silicon granules having a first average particle size to form silicon seed particles having a second and smaller average particle size, comprising comminuting silicon granules in a fluidized bed having a second cross section and a first solids concentration of silicon granules comprising a milling zone, said comminuting caused by impingement of particles in said milling zone with silicon granules accelerated by a high-speed milling gas stream in a jet chamber of a first cross section in smaller than said second cross section and in which there is a second solids concentration of silicon particles lower than said first solids concentration, resulting in comminution of silicon granules and silicon particles in said fluidized bed, and collecting said silicon seed particles having a second and smaller average particle size.

21. The process of claim 20, wherein the first solids concentration is 20 to 50% by volume and the second solids concentration is less than 10% by volume.

22. The process of claim 20, wherein the first solids concentration is 20 to 50% by volume and the second solids concentration is less than 5% by volume, but greater than 0.1% by volume.

23. The process of claim 20, wherein the weight average size of the silicon granule particles to be comminuted is from 300 µm to 5000 µm.

24. The process of claim 20, wherein the milling gas is selected from the group consisting of air, argon and nitrogen.

25. The process of claim 24, wherein the nitrogen is purified nitrogen with a purity of greater than 99.9995% by volume.

26. The process of claim 20, wherein the milling gas jet enters the jet chamber at a velocity at the nozzle of more than 300 m/s.

* * * * *